US011247178B2

(12) United States Patent
Smyslova et al.

(10) Patent No.: US 11,247,178 B2
(45) Date of Patent: Feb. 15, 2022

(54) METHOD FOR PROCESSING A PROTEIN-CONTAINING SUSPENSION OR PROTEIN-CONTAINING SOLUTION

(71) Applicant: FRESENIUS MEDICAL CARE DEUTSCHLAND GMBH, Bad Homburg (DE)

(72) Inventors: Liubov Smyslova, Bad Homberg (DE); Juliane Feurle, Frankfurt (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 90 days.

(21) Appl. No.: 16/645,498

(22) PCT Filed: Sep. 11, 2018

(86) PCT No.: PCT/EP2018/074410
§ 371 (c)(1),
(2) Date: Mar. 9, 2020

(87) PCT Pub. No.: WO2019/052989
PCT Pub. Date: Mar. 21, 2019

(65) Prior Publication Data

US 2020/0276540 A1 Sep. 3, 2020

(30) Foreign Application Priority Data

Sep. 12, 2017 (DE) ..................... 10 2017 216 030.6

(51) Int. Cl.
*B01D 63/02* (2006.01)
*C02F 1/44* (2006.01)
*B01D 65/02* (2006.01)

(52) U.S. Cl.
CPC .......... *B01D 65/022* (2013.01); *B01D 63/02* (2013.01); *C02F 1/44* (2013.01); *B01D 2321/02* (2013.01);
(Continued)

(58) Field of Classification Search
CPC .... B01D 63/02; B01D 65/08; B01D 2313/48; B01D 2321/02; B01D 2321/04
See application file for complete search history.

(56) References Cited

U.S. PATENT DOCUMENTS 9,446,354 B2 9/2016 Shevitz
2010/0044321 A1* 2/2010 Vestergaard Frandsen ................ B01D 65/08 210/754
(Continued)

FOREIGN PATENT DOCUMENTS

DE 69527463 T2 12/2002
EP 0483143 A1 5/1992
(Continued)

OTHER PUBLICATIONS

Tsumura Mika et al—JP 2016116465 A Machine Translation—2016 (Year: 2016).*
(Continued)

*Primary Examiner* — Bradley R Spies
(74) *Attorney, Agent, or Firm* — Kilyk & Bowersox, P.L.L.C.

(57) ABSTRACT

The invention relates to a method for the processing of protein-containing suspensions or solutions, for example for concentrating or purifying the protein-containing particles or dissolved protein-containing substance contained in the suspensions or solutions, wherein the protein-containing suspensions or solutions are filtered by means of a filter module and the protein-containing particles or dissolved
(Continued)

protein-containing substance retained in the filter module are conveyed out of the filter module by means of a backwashing fluid.

17 Claims, 2 Drawing Sheets

(52) U.S. Cl.
CPC .. *B01D 2321/04* (2013.01); *B01D 2321/2066* (2013.01); *C02F 2303/04* (2013.01); *C02F 2303/16* (2013.01)

(56) References Cited

U.S. PATENT DOCUMENTS

| | | | | |
|---|---|---|---|---|
| 2010/0193424 | A1 | 8/2010 | Scharstuhl et al. | |
| 2013/0059371 | A1* | 3/2013 | Shevitz | C12M 33/10 435/297.4 |

FOREIGN PATENT DOCUMENTS

| | | | |
|---|---|---|---|
| EP | 0678326 | A1 | 10/1995 |
| EP | 1897602 | A1 | 3/2008 |
| EP | 2846893 | A1 | 3/2015 |
| JP | 2016116465 | A | 6/2016 |
| WO | 2006127579 | A2 | 11/2006 |
| WO | 2008110172 | A2 | 9/2008 |

OTHER PUBLICATIONS

International Preliminary Report on Patentability issued in corresponding International Patent Application No. PCT/EP2018/074410 dated Mar. 17, 2020 (English translation) (10 pages).

International Search Report and Written Opinion issued in corresponding International Patent Application No. PCT/EP2018/074410 (with English translation of International Search Report) dated Dec. 3, 2018 (16 pages).

Office Action issued in corresponding German Patent Application No. 10 2017 216 030.6 dated Jul. 18, 2018 (3 pages).

* cited by examiner

METHOD FOR PROCESSING A PROTEIN-CONTAINING SUSPENSION OR PROTEIN-CONTAINING SOLUTION

This application is a National Stage Application of PCT/EP2018/074410, filed Sep. 11, 2018, which claims priority to German Patent Application No. 10 2017 216 030.6, filed Sep. 12, 2017.

FIELD OF THE INVENTION

The invention relates to a method for processing protein-containing suspensions or solutions containing protein-containing particles or dissolved protein-containing substance dispersed in a carrier fluid. The invention furthermore relates to the use of the method in the con-centration and purification of protein-containing particles or dissolved protein-containing substance.

BACKGROUND OF THE INVENTION

In environmental and quality management, particularly in water treatment and in the liquid processing of biological fluids in medical technology, the need often exists to identify dispersed or dissolved components in aqueous systems so they can be made available for further processing steps and analyses. To that end, it is often necessary for such components to be concentrated and purified from a high degree of dilution. In this context, filtration processes are employed in order to isolate and/or purify such components. In conjunction thereto, there is the need, e.g. particularly in municipal or clinical water supply systems, to be able to identify microorganisms such as viruses, bacteria, or protozoa, pathogens, cells, cell fragments, pyrogens, endotoxins or other protein-containing particles which can be dispersed or dissolved in water resources in highly diluted form and evaluate them as to their health risk.

Concentrating components from diluted aqueous systems requires filtration of large volumes of liquid. Hollow fiber membrane filtration has thereby proven superior to filtration using other membranes. In this regard, various filtration processes have been developed in recent years for concentrating and purifying bacteria, viruses and other protein-containing substances. Employed in particular are the "tangential flow" and the "dead-end" filtration processes.

According to "tangential flow" filtration, the filtration ensues with a membrane, whereby the liquid to be filtered flows along the membrane surface within a filter module. A portion of the liquid thereby passes through the membrane wall within the filter module to an opposite side of the membrane wall. A further portion of the liquid remains on this side of the membrane wall and is directed out of the filter as so-called retentate. The retentate can be recirculated and fed back to the filter again so that the components of the liquid to be filtered as held back by the membrane wall are concentrated in the retentate.

The "tangential flow" method is employed in particular with hollow fiber membrane filters. Fluid is for example conveyed by way of a fluid access on the hollow fiber membrane filter to the lumen side of the hollow fiber membrane, flown through same, and led out of the hollow fiber membrane via a second fluid access and recirculated. Filtrate passes through the membrane wall of the hollow fiber membranes into the fiber interspace of the hollow fiber membrane filter. Membrane-permeant components of the liquid to be filtered are drained off with the filtrate such that there is a simultaneous purification of the components retained in the retentate. The recirculation can be continued until there is a sufficient concentration or purification of the components in the retentate. If large volumes of liquid are intended to be filtered, relatively lengthy circulation processes can result. A disadvantageous consequence is deposits from the liquid to be filtered thereby forming on the membrane surface. These deposits prevent effective filtration and in the worse case lead to blocking the membrane pores, thereby impairing filtration and preventing effective concentration and purification of the components to be isolated. Moreover, it is expedient in the "tangential flow" method for the entire sample to first be provided in a sample container so that the retentate and a concentration of the components in the retentate can be recirculated.

In the "dead-end" filtration method, liquid is introduced into a filter module and passed through the membrane wall by a built-up pressure gradient. The "dead-end" method is usually employed with hollow fiber membrane filters, by liquid being introduced into the hollow fiber membrane filter on the lumen side of the hollow fiber membranes via a fluid access. The ends of the hollow fiber membranes are thereby sealed or blocked so that no fluid can leak out via the ends of the hollow fiber membranes. In particular, the second fluid access at the other end of the hollow fiber membrane is frequently blocked so that all the fluid to be filtered passes through the membrane wall and can be conveyed away as filtrate. The components of the liquid to be filtered which are held back by the membrane collect in the filter, particularly in the lumen of the hollow fiber membranes, and are recovered from the filter in a further conveyance step by backwashing. It is thus also possible to first collect the sample in the filter and store it for later use, e.g. recovery by backwashing.

In terms of the time required, the "dead-end" method is superior to the "tangential flow" method. Disadvantageous, however, is that the membranes tend to get blocked. Protein-containing particles or dissolved protein-containing substance tend to be adsorbed by the membrane wall and settle on the surface and in the pores of the membrane wall. Such blockages can prevent effective recovery of the proteins and impair the filtration. Pretreating hollow fiber membrane filters with bovine serum or sodium polyphosphate (NAPP) or sodium diphosphate is known for purposes of counteracting blockage. However, such processes are disadvantageous since they are time-consuming and the filter may become microbially contaminated. Further known is reducing the adsorption of the protein-containing particles or dissolved protein-containing substance to be evaluated using additives such as NaPP or also TWEEN 80 as surface-active substances during filtration. Thereby considered as disadvantageous is additive contamination of the proteins to be obtained. Additionally, additives can also be added to the backwashing fluid in order to effect a desorption of the protein-containing particles or the dissolved protein-containing substance. However, such additives are also associated with a contaminating of the concentrated protein-containing particles or dissolved protein-containing substance.

U.S. Pat. No. 9,446,354 discloses a method for the filtration of biological fluids using backwashing steps during the filtration process. A protein-containing fluid obtained from a bioreactor is thereby concentrated in a "dead-end" filtration process. The fluid is conveyed by means of a membrane pump which causes significant pressure surges. A reverse filtration thereby ensues during a pump cycle so that protein deposits in the membrane are desorbed. Thus, a greater quantity of retained proteins can be accommodated in the filter without membrane blockage causing an excessively high transmembrane pressure gradient. U.S. Pat. No. 9,446,354 does not describe the recovery of the retained proteins.

JP2016116465 describes a method for recovering a cell concentrate of less contamination. To concentrate the cells in the cell suspension, the cell suspension coming from a reservoir is circulated through the lumen side of a hollow fiber membrane filter in a "tangential flow" process. Filtrate is permeated through the membrane wall into the filtrate area. For purification, a washing fluid is gradually added to the reservoir holding the cell suspension. This process makes no mention of "dead-end" filtration.

The methods described in the prior art are in need of improvement with respect to ease of operation and the purification and concentration rate of protein-containing particles or dissolved protein-containing substance from protein-containing suspensions or solutions. In particular, the recovery rates of the described methods could stand improvement. There is therefore the need to provide an improved method for processing cell suspensions which resolves the described disadvantages.

TASK OF THE INVENTION

Hence, in a first aspect of the invention, the task is that of providing a method for processing protein-containing suspensions or solutions with little effort and which ensures a high recovery of the protein-containing particles or the dissolved protein-containing substance.

SUMMARY OF THE INVENTION

The task is inventively solved in a first aspect of the invention by a method for processing a protein-containing suspension or solution in accordance with claim 1. Subclaims 2 to 13 constitute preferential embodiments of the first aspect of the invention.

In a second aspect, the task is inventively solved by the use of the method according to claims 1 to 13 for purifying protein-containing particles or dissolved protein-containing substance in a carrier fluid in accordance with claim 14.

In a third aspect, the task is inventively solved by the use of the method according to claims 1 to 13 for concentrating protein-containing particles or dissolved protein-containing substance in a carrier fluid in accordance with claim 15.

DETAILED DESCRIPTION OF THE INVENTION

A first aspect of the invention relates to a method for the processing of protein-containing suspensions or solutions comprising the steps:

- Providing a filter module with an interior divided into a retentate chamber and a filtrate chamber by at least one porous membrane wall, wherein the retentate chamber has at least one first and one second fluid access and the filtrate chamber has at least one fluid access,
- Providing at least one source of protein-containing suspension or solution containing protein-containing particles or dissolved protein-containing substance suspended in a carrier fluid, wherein the source of the protein-containing suspension or solution can be connected at least to the first fluid access to the retentate chamber by fluid lines,
- Providing one or more sources of a washing fluid, wherein the one or more washing fluid sources can be connected at least to the first or second fluid access to the retentate chamber and to the at least one fluid access to the filtrate chamber,
- Providing at least one pump means for pumping protein-containing suspension or solution and washing fluid through the fluid lines,
- Pumping protein-containing suspension or solution from the source of the protein-containing suspension or solution into the retentate chamber of the filter module in a first conveyance step,
- Conveying the protein-containing suspension or solution fluid across the membrane wall into the filtrate chamber,
- where applicable, draining off the fluid obtained in the filtrate chamber via the at least one fluid access of the filtrate chamber, characterized in that washing fluid is pumped into the filtrate chamber and the retentate chamber from the one or more sources of washing fluid in a second conveyance step and backwashing fluid containing protein-containing particles or dissolved protein-containing substance is drained off from the retentate chamber.

The method has the advantage of being able to be easily performed by means of "dead-end" filtration. The described method is furthermore characterized by a high protein-containing particle or dissolved protein-containing substance recovery rate. In particular, the method is suitable for purifying and concentrating cells, pathogens, viruses, pyrogens, endotoxins, microvesicles or other protein-containing particles or dissolved protein-containing substance of high dilutions such as from e.g. drinking water, so that further microbial analyses can be performed on the acquired samples.

The term "proteins" is to be understood as all amino acid-based macromolecules able to be suspended or dissolved in a carrier fluid as particles and purified and concentrated by membrane filtration. In this context, a "protein-containing suspension or solution" refers to a suspension or solution in a carrier fluid which contains cells, proteins, protein-containing pathogens, viruses, pyrogens, endotoxins or microvesicles. A "carrier fluid" in this context refers in particular to an aqueous liquid, further particularly water.

A filter module with a membrane is used in the inventive method, the nature of the membrane being characterized by being able to retain the protein-containing particles or dissolved protein-containing substance to be analyzed. The protein retention is coupled with the pore size of the membrane's selective layer. Should e.g. viruses be isolated, it is advisable to use a membrane with a pore size smaller than 20 nm. A value for the separating property of a membrane is the molecular cut-off, which is indicated as the molecular weight of a substance able to be reliably separated. Cut-off is frequently indicated in kDa. A filter's cut-off is determined according to EN ISO 8637:2014 by measuring the sieving coefficient. The membrane of the filter module divides the interior of the filter module into two chambers. The first chamber of the filter module is intended for the retention of the protein-containing suspension or solution to be filtered. The carrier fluid of the protein-containing suspension or solution can enter into the second chamber of the filter module by filtration across the membrane wall. Unfiltered fluid and the sample remain in the first chamber of the filter module and are termed "retentate." The present application therefore refers to the first chamber as the "retentate chamber." Fluid which passes the membrane wall into the second chamber of the filter module is termed "filtrate." The present application accordingly calls the chamber of the filter module in which the filtrate accumulates the "filtrate chamber."

The filter module has multiple fluid accesses, whereby the retentate chamber has at least two fluid accesses and the filtrate chamber has at least one fluid access. As defined by the present application, a "fluid access" is to be understood as a port on the filter module via which fluid, in particular protein-containing suspension or solution or washing fluid, can be introduced into the filter module, e.g. either into the retentate chamber or the filtrate chamber. A fluid access referred to as such is also equally suited to draining off fluid, in particular the filtrate or the retentate, from the filter module.

The protein-containing suspension or solution is provided for the filtration by a source for protein-containing suspension or solution. Within the meaning of the present application, a reservoir holding a supply of the protein-containing suspension or solution can serve as the "source" for a protein-containing suspension or solution. A protein-containing suspension or solution feed which continuously supplies protein-containing suspension or solution can however also serve as the source. In particular, this can also refer to the feed of drinking water contaminated with protein-containing particles or dissolved protein-containing substance from a sampling station. Moreover, the obtaining and providing of protein-containing suspensions or solutions from upstream processes can also constitute a source of a protein-containing suspension or solution within the meaning of the present application.

Furthermore, the inventive method provides for a source for a washing fluid for the processing of the protein-containing suspension or solution. The "source" of the washing fluid can be a reservoir storing washing fluid for use in the inventive method. The feed of washing fluid from a sampling station can however also be understood as the source. In particular to be understood as a source is the provision of washing fluid from a prepara-tion unit which prepares and supplies a washing fluid from multiple components.

The washing fluid can also be a liquid which serves to replace the carrier fluid of the protein-containing suspension or solution and thereby purify the protein-containing particles or the protein-containing dissolved substance of accompanying substances such as e.g. impurities present in the carrier fluid. The washing fluid can be water. In particular, the washing fluid can contain further additives serving to prevent a denaturing of the present proteins as well as minimize further detrimental effects so as to prevent denaturation, adsorption or defragmentation of the proteins.

In particular, the washing fluid can contain common salt, if applicable in physiological concentration. The washing fluid can moreover contain a surfactant, e.g. TWEEN 80. TWEEN 80 is a tenside of the polyoxyethylene sorbitan monooleate compound class. Advantageous with such a washing fluid composition is the adsorbed protein-containing particles or dissolved protein-containing substance being desorbed particularly well.

Furthermore, according to the inventive method, at least one pump means conveys the protein-containing suspension or solution from the source of the protein-containing suspension or solution to the retentate chamber via fluid lines. In the sense of the present application, "pump means" is to be understood as any means able to convey liquids by way of a change in pressure. The inventive method in particular provides for the use of membrane pumps or peristaltic pumps, particularly hose roller pumps, as is well known in the medical technology field. Impeller pumps can also be used in the inventive method. The selection of the suitable pump also depends on the medium to be pumped, whereby the gentlest possible pumping method for the respective protein-containing particles or protein-containing dissolved substance is preferential. It can further be provided for the pump means to drain off filtrate from the filter module. It can further be provided for pump means to convey washing fluid into the filtrate chamber and the retentate chamber. In particular, it can be provided for the washing fluid, protein-containing suspension or solution, retentate or backwashing fluid to be conveyed by way of a pump means. It can alternatively be provided for washing fluid to be pumped into the filtrate chamber and the retentate chamber by a plurality of pump means. In particular, a plurality of pump means can also be provided to order to convey the protein-containing suspensions or solutions, washing fluid, retentate or backwashing fluid.

The pump means can be configured so as to pump washing fluid and/or protein-containing suspension or solution from the respective source to the filter module in a first conveying direction and channel retentate or backwashing fluid out of the filter in a second conveying direction.

The inventive method provides for the at least one source of the protein-containing suspension or solution to be able to be connected to at least one first fluid access of the retentate chamber via fluid lines and protein-containing suspension or solution be pumped via the at least one pump means to the filter module. Any connection system suitable for conveying the liquids provided in the inventive method can serve as a "fluid line." In particular, flexible hose systems as known in medical technology, in particular dialysis, can serve as fluid lines. In this context, "hose systems" are to be understood as apparatus comprised of tube sections, connectors and other functional elements such as e.g. injection/extraction ports or pressure analysis units and intended for the conveyance of liquids.

It is furthermore provided for the one or more sources of the washing fluid to be able to be connected to the at least one first fluid access of the retentate chamber via fluid lines and washing fluid to be able to be pumped into the retentate chamber of the filter module by at least one pump means.

It is furthermore provided for the one or more sources of the washing fluid to be able to be connected to the at least one first fluid access on the filtrate chamber via fluid lines and washing fluid to be able to be pumped into the filtrate chamber of the filter module by at least one pump means.

According to the inventive method, the source of the protein-containing suspension or solution is connected to the filter module by the first fluid access via a fluid tube in a first conveyance step. Protein-containing suspension or solution is pumped in a first conveying direction from the source of the protein-containing suspension or solution into the retentate chamber of the filter module. A portion of the protein-containing suspension or solution carrier fluid thereby passes through to the filtrate chamber of the filter module. The protein-containing particles or the dissolved protein-containing substance are thereby concentrated in the retentate chamber, and if applicable purified, since a portion of the carrier fluid is separated via the membrane wall as filtrate. The filtrate accumulating in the filtrate chamber can be drained out of the filtrate chamber if need be by pump means and e.g. directed to a holding tank or discarded.

In a second conveyance step, the one or more sources of washing fluid is connected to the at least one fluid access of the filtrate chamber via fluid tubes of the filter module, wherein the one or more sources of washing fluid is furthermore connected to the first or the second fluid access of the retentate chamber. The pump means then pumps the washing fluid into the retentate chamber and the filtrate chamber. The protein-containing particles or dissolved protein-containing substance concentrated in the retentate chamber after the first conveyance step can be drained off in concentrated and purified form by the washing fluid entering in the second conveyance step. The washing fluid containing the protein-containing particles or dissolved protein-containing substance drained from the retentate chamber in the second conveyance step is termed the "backwashing fluid."

In a further embodiment according to the first aspect, the method is characterized by the second fluid access on the retentate chamber of the filter module being blocked so as to be impervious to fluid in the first conveyance step. According to this implementation, protein-containing suspension or dissolved protein-containing substance is introduced into the retentate chamber of the filter module in the first conveyance step. The liquid-tight blocking of the second fluid access at the retentate chamber of the filter module has the effect of preventing a draining of the protein-containing suspension or solution from the retentate chamber such that all the protein-containing particles or dissolved protein-containing substance are concentrated in the retentate chamber. Thus, the protein-containing suspension or solution is processed pursuant to "dead-end" filtration in the first conveyance step. "Dead-end" filtration has the advantage of being able to process protein-containing suspensions or solutions at greater dilution. Additionally, less time is required for the processing of the protein-containing suspensions or solutions as in "tangential flow" filtration.

In a further embodiment, the inventive method is characterized by protein-containing suspension or solution being pumped from the source of the protein-containing suspension or solution to the retentate chamber via the first fluid access on the filter module in the first conveyance step and washing fluid being pumped from the one or more sources of washing fluid into the retentate chamber of the filter module via the at least one first fluid access in the second conveyance step and the backwashing fluid containing the protein-containing particles or dissolved protein-containing substance being drained via the second fluid access on the retentate chamber. The pumping of the washing fluid into the retentate chamber in the second conveyance step thereby ensues in the same conveying direction as the pumping of the protein-containing suspension or solution into the retentate chamber in the first conveyance step. The draining of the protein-containing particles or the dissolved protein-containing substance with the backwashing fluid via the second fluid access on the retentate chamber of the filter module is also called "forward washing." Forward washing is characterized by a simply designed recovery of the protein-containing particles or dissolved protein-containing substance retained in the retentate chamber.

In a further embodiment, the inventive method is characterized by the filter module being a hollow fiber membrane filter. Such hollow fiber membrane filters are known in the prior art, particularly in water treatment, dialysis and apheresis. The hollow fiber membrane filters known in the prior art have a high membrane surface area relative to the module size and can be operated at a high flow rate of the liquids to be filtered, in this case the protein-containing suspensions or solutions. Customarily, hollow fiber membrane filters have two fluid accesses on the retentate chamber as well as a further two fluid accesses on the filtrate chamber. Such hollow fiber membrane filters can be used for the present inventive method. In using the hollow fiber membrane filters in the inventive method, individual fluid accesses can be blocked so as to be impervious to fluids. According to one embodiment, these are e.g. the second fluid access at the retentate chamber and one of two fluid accesses at the filtrate chamber in the first conveyance step.

In a further embodiment, the inventive method is characterized by the lumen side of the hollow fiber membranes forming the retentate chamber and the fiber interspace forming the filtrate chamber. Such a configuration has the advantage of enabling simple and reliable recovery of the protein-containing particles or the protein-containing dissolved substance, in particular because the volume of the inner lumen of the filter module is small and easily accessible and moreover without or with only low dead volume.

In a further embodiment, the inventive method is characterized by the simultaneous conveying in the second conveyance step of washing fluid from the at least one source of washing fluid into the filtrate chamber of the filter module per the first conveying direction and the conveying of washing fluid from the at least one source of washing fluid or the one further source of a washing fluid into the retentate chamber of the filter module per the first conveying direction. The simultaneous conveying of the washing fluid into the retentate chamber and the filtrate chamber in the second conveyance step effects better washing of potentially adhering protein particles from the membrane wall. The recovery of the protein-containing particles or the dissolved protein-containing substance is thereby increased.

In a further embodiment, the inventive method is characterized by an equal rate of flow of washing fluid into the retentate chamber and the filtrate chamber in the second conveyance step. The washing fluid can thereby be pumped into the retentate chamber and pumped into the filtrate chamber in the second conveyance step by a pump means, e.g. a peristaltic hose roller pump. Alternatively, a membrane pump can also be used to convey the washing fluid into the retentate chamber and the filtrate chamber. Furthermore, setting a matching washing fluid flow rate into the retentate chamber and the filtrate chamber enables setting a defined transmembrane passage of washing fluid from the filtrate chamber into the retentate chamber. The transmembrane passage of washing fluid from the filtrate chamber into the retentate chamber is referred to as "back-filtration" in the sense of the present application. The filtration direction from the first conveyance step is thereby reversed and supports the release of protein particles adhering to the membrane wall and thus a high recovery of the protein-containing particles or the dissolved protein-containing substance in the backwashing fluid.

In a further embodiment, the inventive method is characterized by the conveying of washing fluid into the filtrate chamber and into the retentate chamber ensuing in alternating pulses. Pump means inducing a pulsating flow of the conveyed washing fluid can in particular be employed to that end. Pulsating pumps are e.g. peristaltic hose roller pumps or membrane pumps. It is to be assumed that when washing fluid is pumped into the retentate chamber and the filtrate chamber in alternating pulses in the second conveyance step, a turbulent flow is created in the retentate chamber holding the protein-containing particles or dissolved protein-containing substance. It is further assumed that the turbulent flow in the retentate chamber mobilizes the protein-containing particles or dissolved protein-containing substance adhering to the membrane wall or within the membrane wall pores for the recovery of the protein-containing particles or the dissolved protein-containing substance. The recovery of the protein-containing particles or the dissolved protein-containing substance in the backwashing fluid is thereby increased.

In a further embodiment, the inventive method is characterized by the filtrate chamber comprising a further fluid access and washing fluid being conveyed into the filtrate chamber in the second conveyance step per the first conveying direction from one or more sources of washing fluid via the first and the further fluid access. This type of implementation enables a further optimized recovery of the protein-containing particles or the dissolved protein-containing substance.

In a further embodiment, the inventive method is characterized by the hollow fiber membranes affording a cut-off for a filter of less than 64 kDa. A filter module containing a membrane with a such cut-off is particularly suitable for concentrating dissolved albumin. Albumin is a particularly nutritionally significant protein. It can also be advantageous to provide such a filter module for a cell suspension treatment, in particular a bacterial suspension. By virtue of the very low cut-off for this application, reliable and good separation is ensured at a particularly high recovery rate. A filter's cut-off is determined according to EN ISO 8637:2014 by sieving coefficient measurement. The cut-off is to thereby be understood in the context of the present application as achieving a sieving coefficient of 0.01 for albumin (64 kDa).

In a further embodiment, the inventive method is characterized by the protein suspension being conveyed into the retentate chamber in the first conveyance step at a flow of at least 200 ml/min, preferentially at least 250 ml/min, preferentially at least 300 ml/min, preferentially at least 350 ml/min, preferentially at least 400 ml/min, preferentially at least 450 ml/min and less than 700 ml/min, preferentially less than 650 ml/min, preferentially less than 600 ml/min, preferentially less than 550 ml/min, preferentially between 200 to 700 ml/min, or between 250 to 650 ml/min, or between 300 to 600 ml/min, or between 350 to 550 ml/min, or between 400 to 550 ml/min, or between 450 to 550 ml/min.

In a further embodiment, the inventive method is characterized by the washing fluid being conveyed from the at least one first source of washing fluid into the filtrate chamber and the washing fluid from the at least one first source of washing fluid or a further source of washing fluid into the retentate chamber of the filter module in the second conveyance step at a flow rate of at least 100 ml/min, preferentially 125 ml/min, and less than 200 ml/min, preferentially 175 ml/min, or at a flow rate of 150 ml/min. The flow rate selection enables particularly advantageous conditions to be provided, particularly when hollow fiber filters having an effective surface area of 1.0 to 2.5 $m^2$ are used. Such filters are particularly readily available commercially.

In a further embodiment, the inventive method is characterized by the filter module being washed with washing fluid prior to the first conveyance step. In this foregoing washing step, the filter module is cleared of contamination which could otherwise degrade the outcome of protein-containing particles or dissolved protein-containing substance recovered in the second conveyance step recovery of the protein-containing particles or dissolved protein-containing substance. Additionally, the washing fluid wets the membrane. Wetting enables the membrane to retain a sufficient amount of endotoxins. For the washing step, sterile water is conveyed into the retentate chamber through the first fluid access on the filter module. The second fluid access on the retentate chamber is blocked to liquid so that sterile water entering into the retentate chamber passes over the membrane wall into the filtrate chamber and is channeled away via the fluid access to the filtrate chamber. Individually washing the filtrate chamber and the retentate chamber with sterile water can be provided to improve the degassing of the filter module.

In a further embodiment, the inventive method is characterized by a washing of the fluid line from the source of the protein-containing suspension or solution to the at least one first access at the filter module with washing fluid subsequent to the first conveyance step and prior to the second conveyance step in order to transport remaining protein-containing particles or dissolved protein-containing substance out of the fluid line in the retentate chamber. Washing the protein-containing particles or the dissolved protein-containing substance from the fluid lines improves the recovery.

A second aspect of the invention relates to the use of the previously described inventive method in purifying protein-containing suspensions or solutions containing protein-containing particles or dissolved protein-containing substance in a carrier fluid. The protein-containing suspensions or solutions at issue can contain unwanted impurities preventing further processing by way of e.g. analyses or cell cultures. In particular, such impurities can be eliminated in the first conveyance step by membrane filtration. The filtered carrier fluid can be replaced where applicable by a corresponding volume of washing fluid so that the protein-containing particles or dissolved protein-containing substance of the protein-containing suspension or solution employed can be obtained from the backwashing fluid in a purified form.

In a third aspect, the invention relates to the use of the previously described inventive method in concentrating protein-containing suspensions or solutions containing protein-containing particles or dissolved protein-containing substance in a carrier fluid. Particularly of interest is concentrating protein-containing particles or dissolved protein-containing substance in a carrier fluid for availability for further processing, e.g. analyses or cell cultures. In particular, the protein-containing particles or the dissolved protein-containing substance can be concentrated by offsetting the carrier fluid filtered in the first conveyance step by a lesser amount of washing fluid in the second conveyance step so that the protein-containing particles or the dissolved protein-containing substance is more highly concentrated in the backwashing fluid than in the protein-containing liquid employed.

DESCRIPTION OF THE INVENTION REFERENCING THE FIGURES

Figure 1:
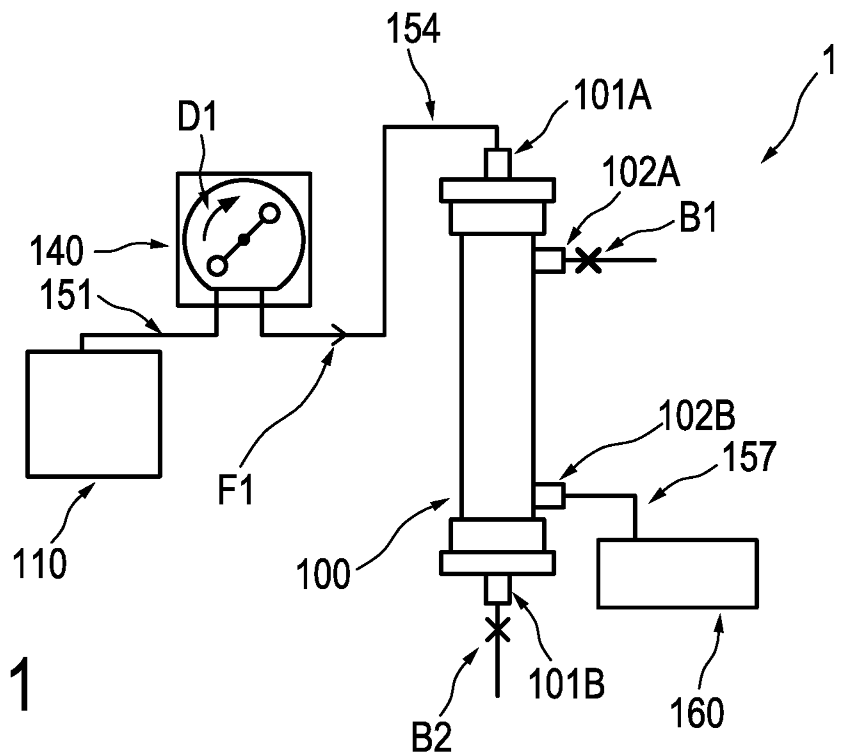
FIG. 1 shows a filtration system for the filtration of a protein-containing suspension or solution in a filter module pursuant to the first conveyance step of the method according to the invention.

The filtration system 1 schematically depicted in FIG. 1 for the filtration of a protein-containing suspension or solution per the first conveyance step of the inventive method comprises a filter module 100 having a retentate chamber and filtrate chamber which are not shown in FIG. 1. The depicted fluid accesses 101A and 101B thereby form inlets to the retentate chamber and filtrate chamber. The depicted fluid accesses 102A and 102B form fluid accesses to the filtrate chamber. In the representation as depicted, the first fluid access 102A on the filtrate chamber and the second fluid access on the retentate chamber 101B are blocked by barrier means B1 and B2 so as to be impervious to fluid. The first fluid access on the retentate chamber is connected to the pump means 140 by fluid line 154. A peristaltic hose roller pump having two rollers is schematically depicted as the pump means. Equally alternatively, a hose roller pump having three rollers, a membrane pump, a gear pump or for example an impeller pump can be used for the filtration per the first conveyance step. Such pumps are particularly suitable since there is no or only slight degradation to the protein-containing particles of the protein-containing suspensions or solutions. In the representation, the conveying direction of the pump means 140 pursuant to the direction of rotation D1 is depicted by an arrow F1. The pump means 140 is connected to the source of a protein-containing suspension or solution 110 by fluid line 151. In the depicted representation, the source is a reservoir storing a volume of protein-containing suspension or solution liquid for extraction. The second fluid access 102B, connected at the filtrate chamber of the filter module 100, is connected by a fluid line 157 to a reservoir 160 provided for receiving the filtrate resulting in the first conveyance step.

Figure 2:
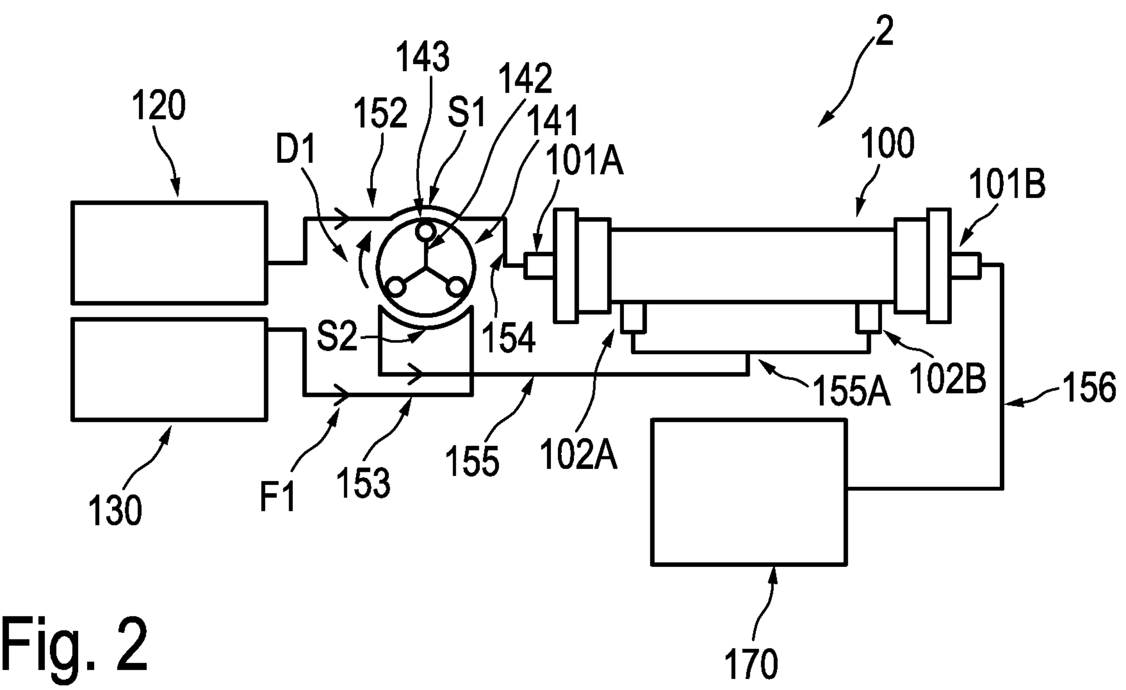
FIG. 2 shows a backwashing system for backwashing protein-containing particles or dissolved protein-containing substance from a filter module pursuant to the second conveyance step of the method according to the invention.

FIG. 2 shows a schematic backwashing system 2 for the backwashing of protein particles out of a filter module pursuant to the second conveyance step of the inventive method. FIG. 2 shows the filter module 100 which is connected to components of the system 2 subsequent the first conveyance step in order to effect a backwashing of the filter module by "forward-washing" and "backward-filtration." FIG. 2 shows the first fluid access 101A and the second fluid access 101B connecting to the retentate chamber of the filter module 100. The depicted fluid connections 102A and 102B connect to the filtrate chamber of the filter module 100, which is not shown in the figure. The first fluid access at the retentate chamber 101A is connected to the pump means 141 via fluid line 154. In the schematic representation as depicted, a peristaltic hose roller pump having three rollers is shown as the pump means. The hose roller pump 141 is further connected to a source of a washing fluid 120 by fluid line 152. A reservoir storing a liquid volume of washing fluid for further extraction serves as said source in the representation as depicted. The hose roller pump 141 is furthermore connected to a further source of a washing fluid 130 via fluid lines 153. The further source is likewise a reservoir storing a liquid volume of washing fluid for further extraction. The hose roller pump 141 is connected to the fluid accesses 102A, 102B connected to the filtrate chamber of the filter module 100 via fluid line 155. The fluid line exhibits a branching point 155A at which the washing fluid fed into the fluid line 155 is distributed to fluid accesses 102A and 102B. The conveying direction F1 of the washing fluid from sources 120 and 130 to the filter module 100 is effected pursuant to the direction of rotation D1 of the hose roller pump utilized. In the representation as depicted, the fluid lines leading from the sources of washing fluid 120, 130 to the filter module are in connection with a pump means. Two hose segments S1 and S2 are thereby in connection with a source of a washing fluid 120, 130 via a respective fluid line 152, 153 and are engaged with the hose roller pump. "Engaged" hereby means that the rollers of the hose roller pump can compress the hose segments S1 and S2 in the sense of peristaltic conveyance and force washing fluid toward the filter module 100. The rotor 142 of the hose roller pump 141 has three rollers 143. It can be provided in a further embodiment for the hose segments S1 and S2 and the rollers 143 of the hose roller pump 141 to be arranged such that one respective roller engages with one of the hose segments S1 or S2 and the other two rollers do not substantially engage with the hose segments during pump operation. In this embodiment, pressure pulses are alternatingly produced in the retentate chamber and the filtrate chamber via fluid lines 154 and 155 so that improved recovery of the protein-containing particles or the dissolved protein-containing substance can be achieved. The backwashing fluid containing protein-containing particles or dissolved protein-containing substance exiting with the washing fluid at fluid access 101B is collected in a sample reservoir 170 via fluid line 156.

Figure 3:
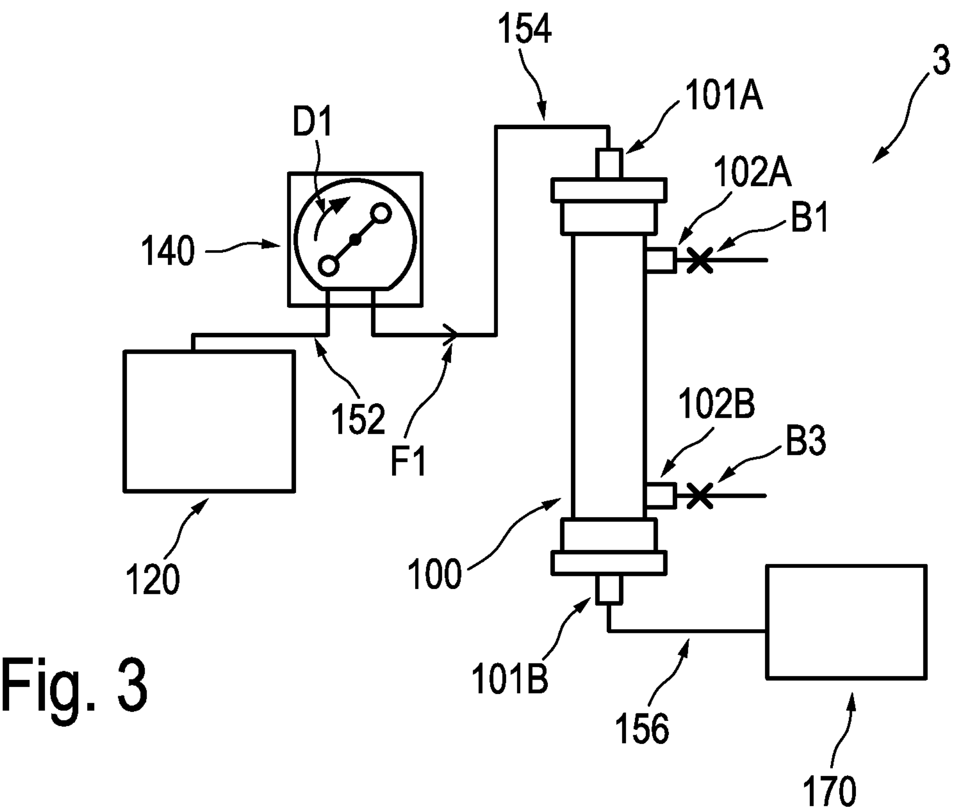
FIG. 3 shows a backwashing system for backwashing protein-containing particles or dissolved protein-containing substance from a filter module according to a non-inventive method.

FIG. 3 shows a schematic depiction of a backwashing system 3 for the backwashing of protein-containing particles or dissolved protein-containing substance from a filter module pursuant to a conveyance step of a comparative method. FIG. 3 shows the filter module 100 which is connected to components of the system 3 subsequent the first conveyance step in order to effect a backwashing of the filter module by "forward-washing." FIG. 3 further shows the first fluid access 101A and the second fluid access 101B connecting to the (not shown) retentate chamber of the filter module 100. The depicted fluid connections 102A and 102B connect to the filtrate chamber of the filter module 100, which is not shown in the figure. The first fluid access on the retentate chamber 101A is connected to the pump means 140 via fluid line 154. In the schematic representation as depicted, a peristaltic hose roller pump having two rollers is shown as the pump means. The pump means is further connected to a source of a washing fluid 120 by fluid line 152. A reservoir storing a liquid volume of washing fluid for further extraction serves as said source in the representation as depicted. The direction of rotation D1 of the hose roller pump thereby conveys washing fluid in conveying direction F1 from the source 120 to the first fluid access 101A in the retentate chamber of the filter module 100. The fluid accesses 102A, 102B connecting at the filtrate chamber of the filter module 100 are blocked by barrier means B1 and B3 so as to be impervious to fluid. The backwashing fluid containing the protein-containing particles or dissolved protein-containing substance exiting with the washing fluid at fluid access 101B is collected in a sample reservoir 170 via fluid line 156.

Figure 4:
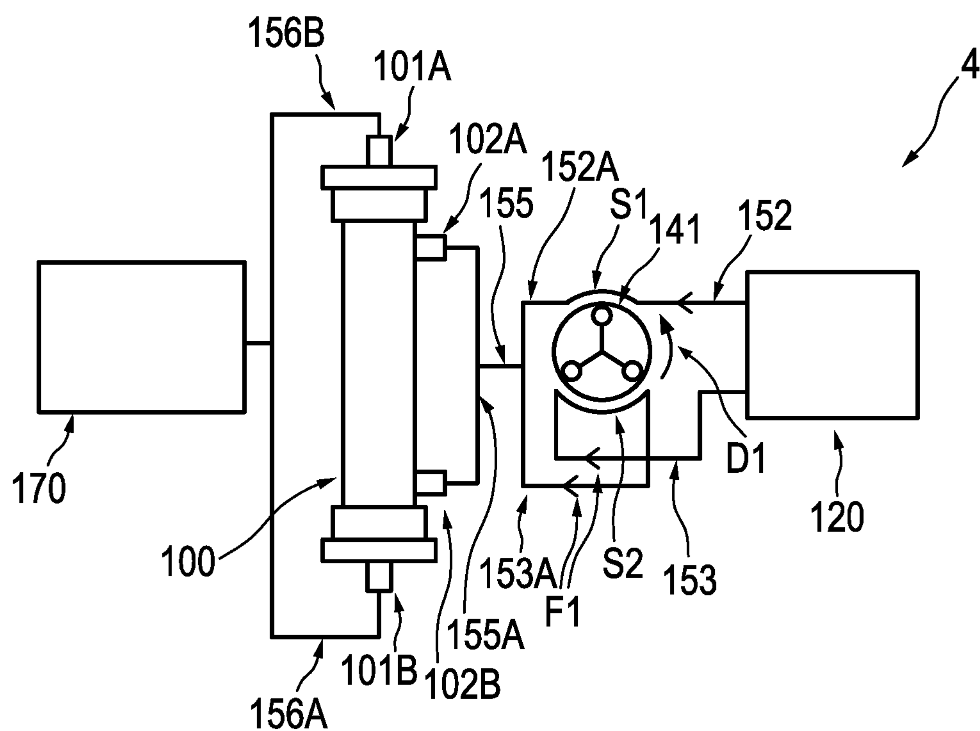
FIG. 4 shows a backwashing system for backwashing protein-containing particles or dissolved protein-containing substance according to a further non-inventive method.

FIG. 4 shows a schematic representation of a backwashing system 4 for the back-washing of protein-containing particles or dissolved protein-containing substance from a filter module 100 pursuant to a conveyance step of a comparative method. FIG. 4 shows the filter module 100 which is connected to components of the system 4 subsequent the first conveyance step in order to effect a backwashing of the filter module by "back-filtration." FIG. 4 further shows the first fluid access 101A and the second fluid access 101B connecting to the not-shown retentate chamber of the filter module 100. The depicted fluid connections 102A and 102B connect to the filtrate chamber of the filter module 100, which is not shown in the figure. In the schematic representation as depicted, a peristaltic hose roller pump having three rollers is shown as the pump means 141. Fluid lines 152 and 153 furthermore lead from the source of the washing fluid 120 to the hose segments S1 and S2. The hose segments are arranged opposite each other on the hose roller pump 141. The fluid lines 153 and 152 thereby connect to the hose segments S1 and S2 so as to enable conveyance of the washing fluid from the source of the washing fluid to the hose roller pump and then further to the filter module as per conveying direction F1. Fluid lines 152A and 153A connect to the hose segments S1 and S2 on the hose roller pump 141 and are merged into one fluid line 155. Two fluid lines lead in each case to the respective first fluid access 102A and second fluid access 102B of the filter module 100 from branching point 155A so that washing fluid can be conveyed into the filtrate chamber of the filter module. The system furthermore comprises fluid lines 156A and 156B leading from the fluid accesses 101A and 101B of the filter module to the sample reservoir 170. In so doing, washing fluid can pass through the membrane wall from the filtrate chamber into the retentate chamber via back-filtration and be captured in the sample reservoir as the back-washing fluid containing the protein-containing particles or dissolved protein-containing substance.

DESCRIPTION OF THE INVENTION REFERENCING EXAMPLES

Example 1

A protein-containing suspension was prepared by adding 8 liters of sterile-filtered water to 40 ml of a bacterial suspension containing $10^5$ CFU/ml *E. coli*. The CFU unit stands for "colony forming units," thus the number of living cells able to be determined by known cell cultivation methods. A filter system pursuant to FIG. 1 was prepared by the "dead-end" washing of the system with sterile-filtered water. The filter module used was a model HF80S hollow fiber membrane filter from the Fresenius Medical Care company, Germany. The HF80S filter is used as a dialyzer in renal replacement therapy and has a high permeation rate for low-molecular substances and a high retention rate for substances such as albumin at a molecular weight of 64 kDa. The filter cut-off is less than 64 kDa. That means that dissolved molecules having a molecular weight such as albumin or greater and e.g. bacteria, cells and microvesicles are reliably retained. The filter has an effective surface area of 1.8 $m^2$ with the inner lumen of the fibers. The blocking means B1, B2 of the system were subsequently switched such that the filtrate chamber and retentate chamber were each individually washed until the entire system filled with washing fluid and was free of air pockets. The concentration of the *E. coli* bacteria was thereafter determined in an initial fraction of approx. 2 liters of produced *E. coli* suspension. The initial fraction was then filtered pursuant to "dead-end" filtration in accordance with the filtration system depicted in FIG. 1 and the filtered *E. coli* suspension volume documented. The fluid lines leading to the hollow fiber membrane filter were subsequently washed with washing fluid in order to transport the remaining *E. coli* bacteria out of the lines in the retentate chamber of the filter. The *E. coli* suspension and the washing fluid were transported at a flow rate of 500 ml/min.

The *E. coli* suspension was filtered with two further hollow fiber membrane filters of the same HF80S type under the same process conditions. Thus obtained were 3 hollow fiber membrane filters loaded with approximately the same amount of *E. coli* bacteria in the retentate chamber. The respectively filtered volumes of the initial fraction, the concentration of *E. coli* bacteria in the respective initial fraction, and the calculated *E. coli* bacterial count with which a respective hollow fiber membrane filter was loaded are documented in Table 1.

TABLE 1

| Hollow fiber membrane filter number | Filtered volume of initial fraction | *E. coli* concentration in initial fraction | *E. coli* count in hollow fiber membrane filter |
|---|---|---|---|
| 1 | 2143.6 ml | $1.3 \times 10^3$ | $2.49 \times 10^6$ |
| 2 | 2070.3 ml | $1.1 \times 10^3$ | $2.79 \times 10^6$ |
| 3 | 2077.1 ml | $1.2 \times 10^3$ | $2.28 \times 10^6$ |

The hollow fiber membrane filters were removed from the filtration system free of contamination and used for integration into a backwashing system according to FIGS. 2 to 4.

Example 2

The No. 1 hollow fiber membrane filter laden with *E. coli* under Ex. 1 was integrated into a backwashing system in accordance with FIG. 2. The transport rate of the hose roller pump with which the washing fluid was pumped into the retentate chamber and the filtrate chamber amounted to 150 ml/min. Since the hose roller pump pursuant to the backwashing system was engaged with two hose segments, the total capacity of washing fluid fed to the filter module amounted to 300 ml/min. Utilizing a hose pump rotor having three rollers and two hose segments effected the simultaneous backwashing of the retentate chamber and filtrate chamber, albeit at alternatingly pulsating pressure ratios. The backwashing ensued with a solution containing 0.8% by weight common salt and 0.1% by weight TWEEN 80. The backwashing itself ensued in five steps, whereby a washing fluid volume of 100 ml was used for the first three backwashing steps and a washing fluid volume of 200 ml was used for the fourth backwashing step. A final washing step then followed with a volume of approx. 200 ml. The backwashing fluid containing the *E. coli* bacteria was collected in the sample reservoir. The samples were analyzed in terms of the exact volume, count and concentration of the *E. coli* bacteria as well as the recovery rate. The results are documented in Table 2.

Comparative Example 1

The No. 2 hollow fiber membrane filter laden with *E. coli* under Ex. 1 was integrated into a backwashing system in accordance with FIG. 3. The transport rate of the hose roller pump conveying the washing fluid into the retentate chamber and the filtrate chamber amounted to 300 ml/min. The backwashing solution was an 0.8 wt % saline solution with 0.1% by weight of TWEEN 80. The backwashing itself ensued in four steps, whereby a washing fluid volume of 100 ml was used for the first three backwashing steps and a washing fluid volume of 200 ml was used for the fourth backwashing step. A final washing step then followed with a volume of approx. 200 ml. The backwashing fluid containing the *E. coli* bacteria was collected in the sample reservoir. Respective samples at a volume of approx. 100 ml and 200 ml of the backwashing fluid containing the *E. coli* bacteria were collected in the sample reservoir. The samples were analyzed in terms of the exact volume, count and concentration of the *E. coli* bacteria as well as the recovery rate. The results are documented in Table 2.

Comparative Example 2

The No. 3 hollow fiber membrane filter laden with *E. coli* under Ex. 1 was integrated into a backwashing system in accordance with FIG. 4. The transport rate of the hose roller pump conveying the washing fluid into the retentate chamber and the filtrate chamber amounted to 150 ml/min. The backwashing solution was an 0.8 wt % saline solution with 0.1% by weight of TWEEN 80. Since the hose roller pump pursuant to the backwashing system was engaged with two hose segments, the total capacity of washing fluid fed to the filter module amounted to 300 ml/min. The backwashing itself ensued in four steps, whereby a washing fluid volume of 100 ml was used for the first three backwashing steps and a washing fluid volume of 200 ml was used for the fourth backwashing step A final washing step then followed with a volume of approx. 200 ml. The backwashing fluid containing the *E. coli* bacteria was collected in the sample reservoir. The samples were analyzed in terms of the exact volume, count and concentration of the *E. coli* bacteria as well as the recovery rate. The results are documented in Table 2.

TABLE 2

| | Sample 1 | Sample 2 | Sample 3 | Sample 4 | Final sample |
|---|---|---|---|---|---|
| Example 2 | | | | | |
| Volume [ml] | 100.8 | 102.6 | 97.9 | 210.8 | 313 |
| *E. coli* concentration [CFU/ml] | $1 \times 10^4$ | $9.1 \times 10^3$ | $1.4 \times 10^3$ | $4.3 \times 10^2$ | 0 |
| *E. coli* count [CFU] | $1.01 \times 10^6$ | $9.34 \times 10^5$ | $1.37 \times 10^5$ | $9.06 \times 10^4$ | 0 |
| Comparative example 1 | | | | | |
| Volume [ml] | 102.8 | 98 | 111.7 | 214 | 234.5 |
| *E. coli* concentration [CFU/ml] | $3.5 \times 10^3$ | $7.3 \times 10^3$ | $5.6 \times 10^3$ | $4.8 \times 10^2$ | 20 |
| *E. coli* count [CFU] | $3.6 \times 10^5$ | $7.15 \times 10^5$ | $6.26 \times 10^5$ | $1.03 \times 10^3$ | $4.69 \times 10^3$ |
| Comparative example 2 | | | | | |
| Volume [ml] | 98.6 | 100.1 | 102.1 | 202.9 | 176.3 |
| *E. coli* concentration [CFU/ml] | $7.2 \times 10^3$ | $5.4 \times 10^3$ | $3.4 \times 10^2$ | $1.1 \times 10^3$ | 0 |
| *E. coli* count [CFU] | $7.1 \times 10^5$ | $5.41 \times 10^5$ | $3.47 \times 10^4$ | $2.23 \times 10^5$ | 0 |

Results

The total *E. coli* bacteria count contained in samples 1 to 4 and the final sample amounted to:

Example 2: $2.17 \times 10^6$

Comparative example 1: $1.8 \times 10^6$

Comparative example 2: $1.5 \times 10^6$

The resulting recovery rate determined amounted to:

Example 2: 87%

Comparative example 1: 65%

Comparative example 2: 66%

The individual recovery rates are shown in Table 3.

TABLE 3

| | Recovery rates in % | | | | |
|---|---|---|---|---|---|
| | Sample 1 | Sample 2 | Sample 3 | Sample 4 | Final sample |
| Example 2 | 40.4 | 37.5 | 5.5 | 3.6 | 0 |
| Comparative example 1 | 12.9 | 25.7 | 22.4 | 3.7 | 0.2 |
| Comparative example 2 | 31.2 | 23.7 | 1.5 | 9.8 | 0 |

The recovery rates per the backwashing pursuant to Ex. 1 and comparative example 2 are approximately at the same level. The recovery rate per the backwashing pursuant to Ex. 2 is significantly higher. Moreover, a comparatively high recovery rate is achieved at even just a low washing volume of 200 ml.

The invention claimed is:

1. A method for the processing of protein-containing suspensions or solutions comprising the steps:

providing a filter module having an interior divided into a retentate chamber and a filtrate chamber by at least one porous membrane wall, wherein the retentate chamber has at least one first fluid access and at least one second fluid access and the filtrate chamber has at least one fluid access;

providing at least one source of a protein-containing suspension or solution containing protein-containing particles or dissolved protein-containing substance suspended in a carrier fluid, wherein the source of the protein-containing suspension or solution can be connected at least to the first fluid access to the retentate chamber by fluid lines;

providing one or more sources of a washing fluid, wherein the one or more sources of washing fluid can be connected at least to the first or second fluid access to the retentate chamber and to the at least one fluid access to the filtrate chamber by fluid lines;

providing at least one pump means for pumping protein-containing suspension or solution and washing fluid through the fluid lines;

pumping protein-containing suspension or solution from the source of the protein-containing suspension or solution into the retentate chamber of the filter module in a first conveyance step, the source of the protein-containing suspension or solution is connected to the first fluid access via a first fluid line of the retentate chamber; and conveying the protein-containing suspension or solution fluid across the membrane wall into the filtrate chamber, wherein washing fluid is pumped into the filtrate chamber and the retentate chamber from the one or more sources of washing fluid in a second conveyance step and backwashing fluid containing protein-containing particles or dissolved protein-containing substance is drained off from the retentate chamber via the second fluid access, the one or more sources of washing fluid connected via fluid lines to at least the first or second fluid access of the retentate chamber and connected to the at least one fluid access of the filtrate chamber, and the second fluid access of the retentate chamber of the filter module is blocked so as to be impervious to fluid in the first conveyance step.

2. The method according to claim 1, wherein the filter module is a hollow fiber membrane filter.

3. The method according to claim 2, wherein the lumen side of the hollow fiber membranes forms the retentate chamber and the fiber interspace forms the filtrate chamber.

4. The method according to claim 2, wherein the hollow fiber membranes have a molecular cut-off of less than 64 kDa.

5. The method according to claim 1, wherein the conveying of washing fluid into the filtrate chamber of the filter module from the one or more sources of washing fluid in the second conveyance step and the conveying of washing fluid into the retentate chamber of the filter module from the at least one or more sources of washing fluid ensues simultaneously.

6. The method according to claim 1, wherein the washing fluid is conveyed into the filtrate chamber and into the retentate chamber in alternating pulses.

7. The method according to claim 5, wherein the flow rate of the washing fluid into the retentate chamber and the filtrate chamber is substantially equal.

8. The method according to claim 1, wherein the filtrate chamber comprises a further fluid access and washing fluid is conveyed into the filtrate chamber from one or more sources of washing fluid via the at least first and the further fluid access in the second conveyance step.

9. The method according to claim 1, wherein the washing fluid is conveyed into the filtrate chamber of the filter module from the at least one or more sources of washing fluid in the second conveyance step at a flow rate of at least 100 ml/min and/or that the washing liquid is conveyed into the retentate chamber of the filter module from the at least one or more sources of washing fluid in the second conveyance step at a flow rate of at least 100 ml/min.

10. The method according to claim 1, wherein the filter module is washed with washing fluid prior to the first conveyance step.

11. The method according to claim 1, wherein the fluid line from the source of the protein-containing suspension or solution to the at least one first access at the filter module is washed with washing fluid between the first conveyance step and the second conveyance step in order to transport protein-containing particles or dissolved protein-containing substance out of the fluid line in the filtrate chamber.

12. A method for purifying protein-containing particles or dissolved protein-containing substance in a carrier fluid, said method comprising utilizing the method of claim 1.

13. A method for concentrating protein-containing particles or dissolved protein-containing substance in a carrier fluid, said method comprising utilizing the method of claim 1.

14. The method of claim 9, wherein flow rate is from 125 ml/min to less than 200 mil/min.

15. The method of claim 9, wherein flow rate is between 100 ml/min and 200 mil/min.

16. The method of claim 9, wherein flow rate is between 125 ml/min and 175 mil/min.

17. The method of claim 1, wherein the fluid obtained in the filtrate chamber is drained off via the at least one fluid access of the filtrate chamber in the first conveyance step.

* * * * *